US008736656B2

(12) United States Patent
Zhang

(10) Patent No.: US 8,736,656 B2
(45) Date of Patent: May 27, 2014

(54) METHOD AND APPARATUS FOR MCU TO OPTIMIZE CONFIGURATION OF MULTIPLE PICTURES

(71) Applicant: Huawei Technologies Co., Ltd, Shenzhen (CN)

(72) Inventor: Feng Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/975,862

(22) Filed: Aug. 26, 2013

(65) Prior Publication Data

US 2013/0342634 A1  Dec. 26, 2013

Related U.S. Application Data

(63) Continuation of application No. PCT/CN2012/076842, filed on Jun. 13, 2012.

(30) Foreign Application Priority Data

Jun. 13, 2011 (CN) .......................... 2011 1 0157719

(51) Int. Cl.
H04N 7/14 (2006.01)
(52) U.S. Cl.
USPC ....................................... 348/14.01; 709/204
(58) Field of Classification Search
USPC ................................................ 348/14–14.09
See application file for complete search history.

(56) References Cited

U.S. PATENT DOCUMENTS

| 6,124,881 A | 9/2000 | Terui et al. |
| 6,211,902 B1 | 4/2001 | Tanoi |
| 6,417,880 B1* | 7/2002 | Uomori et al. ........ 348/E13.014 |
| 7,417,880 B2* | 8/2008 | Pawel et al. .................... 363/132 |
| 2006/0139445 A1 | 6/2006 | Xiong et al. |
| 2009/0309897 A1* | 12/2009 | Morita et al. ................. 345/629 |

FOREIGN PATENT DOCUMENTS

| CN | 1422079 A | 6/2003 |
| CN | 101286314 A | 10/2008 |
| CN | 101707714 A | 5/2010 |

* cited by examiner

Primary Examiner — Maria El-Zoobi
(74) Attorney, Agent, or Firm — Conley Rose, P.C.; Grant Rodolph; Nicholas K. Beaulieu

(57) ABSTRACT

A method and an apparatus for Multiple Control Unit (MCU) to optimize configuration of multiple pictures are disclosed. The solutions provided by embodiments of the present invention include: calculating, according to resolutions, bandwidths, frame rates, importance, and volume of received video images sent by N conferencing terminals, the area occupied by each of the video images in a picture presented on an MCU display screen; and dividing, according to the area occupied by each of the video images in the picture presented on the MCU display screen, the picture into N regions, and filling the video images sent by the N conferencing terminals into corresponding regions of the picture.

9 Claims, 5 Drawing Sheets

METHOD AND APPARATUS FOR MCU TO OPTIMIZE CONFIGURATION OF MULTIPLE PICTURES

CROSS-REFERENCE TO RELATED APPLICATIONS

This application is a continuation of International Application No. PCT/CN2012/076842, filed on Jun. 13, 2012, which claims priority to Chinese Patent Application No. 201110157719.2, filed on Jun. 13, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communication network technologies, and in particular, to a method and an apparatus for Multipoint Control Unit (MCU) to optimize configuration of multiple pictures.

BACKGROUND

Conventional video conferencing supports a multi-picture conference. Real conditions of each conferencing terminal participating in the conference may be presented on an output television of the conferencing terminal. After the conference begins, the multi-picture mode presented on each conferencing terminal is a preset mode. After each conferencing terminal in the conference joins the conference, an MCU decodes and filters the received image of each conferencing terminal, and then selects the most appropriate multi-picture mode according to the number of conferencing terminals. For example, currently the preset multi-picture modes include a 2-picture mode and a 4-picture mode; when three conferencing terminals join the conference, the system selects the 4-picture mode for displaying, zooms the image according to the size of a sub-picture, then fills the image into the corresponding sub-picture, and finally encodes the multi-picture image adjusted by the MCU and sends it to each conferencing terminal in the conference.

However, when the prior art is used for optimizing configuration of multiple pictures, because the multi-picture mode is preset, the phenomenon of blank sub-picture screens occurs.

SUMMARY

Embodiments of the present invention provide a method and an apparatus for MCU multi-picture optimization configuration, which can eliminate the phenomenon of blank sub-picture screens.

To achieve the preceding objective, the embodiments of the present invention adopt the following technical solutions:

A method for MCU to optimize configuration of multiple pictures includes: calculating, according to resolutions, bandwidths, frame rates, importance, and volume of received video images sent by N conferencing terminals, the area occupied by each of the video images in a picture presented on an MCU display screen, where N is a natural number greater than or equal to 2; and dividing, according to the area occupied by each of the video images in the picture presented on the MCU display screen, the picture presented on the MCU display screen into N regions, and filling the video images sent by the N conferencing terminals into corresponding regions of the picture presented on the MCU display screen.

An apparatus for MCU to optimize configuration of multiple pictures includes: a calculating unit configured to calculate, according to resolutions, bandwidths, frame rates, importance, and volume of received video images sent by N conferencing terminals, the area occupied by each of the video images in a picture presented on an MCU display screen, where N is a natural number greater than or equal to 2; and a filling unit configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen.

By using the method and apparatus for MCU to optimize configuration of multiple pictures according to the embodiments of the present invention, the area occupied by video images sent by N conferencing terminals in a picture presented on an MCU display screen is calculated, and the picture presented on the MCU display screen is divided into N regions according to the area occupied by each of the video images in the picture presented on the MCU display screen, and the video images sent by the N conferencing terminals are filled into corresponding regions of the picture presented on the MCU display screen. Compared with the prior art where the phenomenon of blank sub-picture screens may occur because a multi-picture mode is preset in MCU to optimize configuration of multiple pictures, the solutions provided by the embodiments of the present invention can eliminate the phenomenon of blank sub-picture screens by using a dynamic multi-picture generation mode according to the number of conferencing terminals.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Embodiment 1

Figure 1:
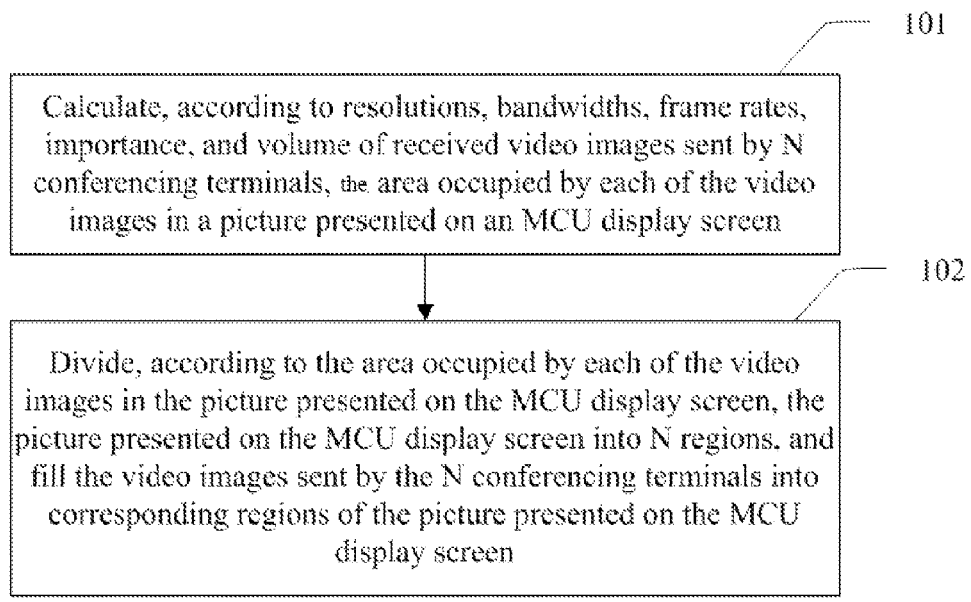
FIG. 1 is a flowchart of a method for MCU to optimize configuration of multiple pictures according to Embodiment 1 of the present invention.

An embodiment of the present invention provides a method for MCU to optimize configuration of multiple pictures. As shown in FIG. 1, the method includes:

Step 101: Calculate, according to resolutions, bandwidths, frame rates, importance, and volume of received video images sent by N conferencing terminals, the area occupied by each of the video images in a picture presented on an MCU display screen, where N is a natural number greater than or equal to 2.

Herein, a conferencing terminal sending a video image may be a camera or software having a sending function.

Step 102: Divide, according to the area occupied by each of the video images in the picture presented on the MCU display screen, the picture presented on the MCU display screen into N regions, and fill the video images sent by the N conferencing terminals into corresponding regions of the picture presented on the MCU display screen.

Herein, after the video images are filled into the corresponding regions of the pictures, the pictures presented on the MCU display screen are multiple pictures. The pictures presented on the MCU display screen are dynamically divided according to the number of conferencing terminals participating in the conference, so that the phenomenon of blank screens can be eliminated.

By using the method for MCU to optimize configuration of multiple pictures according to the embodiment of the present invention, the area occupied by video images sent by N conferencing terminals in a picture presented on an MCU display screen is calculated, and the video images sent by the N conferencing terminals are filled into corresponding regions of the picture presented on the MCU display screen. Compared with the prior art where the phenomenon of blank sub-picture screens may occur because a multi-picture mode is preset in MCU to optimize configuration of multiple pictures, the solution provided by the embodiment of the present invention can eliminate the phenomenon of blank sub-picture screens by using a dynamic multi-picture generation mode according to the number of conferencing terminals.

Figure 2:
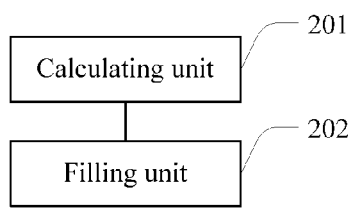
FIG. 2 is a block diagram of an apparatus for MCU to optimize configuration of multiple pictures according to Embodiment 1 of the present invention.

The embodiment of the present invention provides an apparatus for MCU to optimize configuration of multiple pictures. The apparatus may be an MCU or a conferencing terminal integrating an MCU to optimize configuration of multiple pictures processing unit. As shown in FIG. 2, the apparatus includes a calculating unit 201 and a filling unit 202.

The calculating unit 201 is configured to calculate, according to resolutions, bandwidths, frame rates, importance, and volume of received video images sent by N conferencing terminals, the area occupied by each of the video images in a picture presented on an MCU display screen, where N is a natural number greater than or equal to 2.

The filling unit 202 is configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen.

In the apparatus for MCU to optimize configuration of multiple pictures according to the embodiment of the present invention, the calculating unit calculates the area occupied by video images sent by N conferencing terminals in a picture presented on an MCU display screen, and the filling unit fills the N conferencing terminals into corresponding regions of the picture presented on the MCU display screen. Compared with the prior art where the phenomenon of blank sub-picture screens may occur because a multi-picture mode is preset in MCU to optimize configuration of multiple pictures, the solution provided by the embodiment of the present invention can eliminate the phenomenon of blank sub-picture screens by using a dynamic multi-picture generation mode according to the number of conferencing terminals.

Embodiment 2

Figure 3:
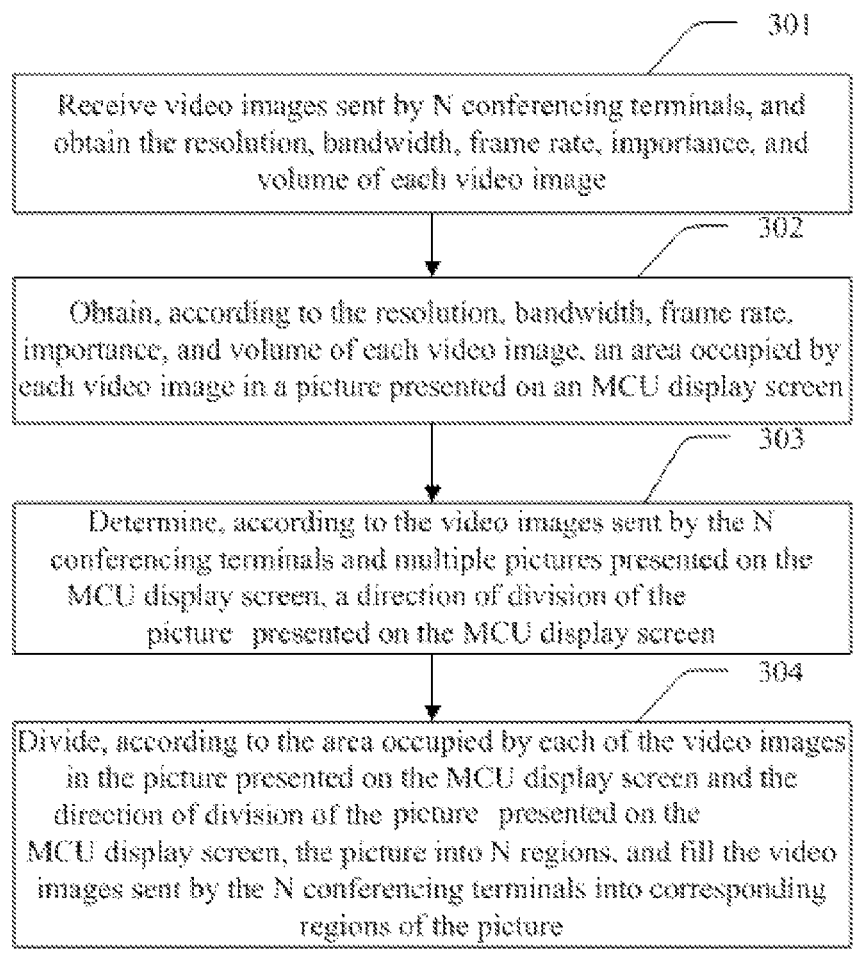
FIG. 3 is a flowchart of a method for MCU to optimize configuration of multiple pictures according to Embodiment 2 of the present invention.

An embodiment of the present invention provides a method for MCU to optimize configuration of multiple pictures. As shown in FIG. 3, the method includes:

Step 301: Receive video images sent by N conferencing terminals, and obtain the resolution, bandwidth, frame rate, importance, and volume of each video image, where N is a natural number greater than or equal to 2.

The MCU receives video streams sent by N conferencing terminals. Herein, a conferencing terminal sending a video image may be a camera or software having a sending function. Then the MCU decodes the video streams to obtain the video images. The MCU obtains the resolution, bandwidth, frame rate, importance, and volume of each video image. Herein, the importance is decided by participants in a conference according to actual conditions, and P may be used to indicate the importance of a video stream, for example, P=30%, which indicates that the importance of the video stream is not high, and P=85%, which indicates that the video stream is quite important. When the video stream is sent, the importance identifier P and a specific value of P of the video stream are carried over a compression protocol.

Step 302: Obtain, according to the resolution, bandwidth, frame rate, importance, and volume of each video image, the area occupied by each video image in a picture presented on an MCU display screen.

Initially, the picture presented on the MCU display screen is a complete picture. After the video images sent by N conferencing terminals are filled according to the method provided by the embodiment of the present invention into the picture presented on the MCU display screen, the picture changes into multiple pictures constituted by two or more sub-pictures.

Specifically, the area occupied by each video image in the picture presented on the MCU display screen is as follows:

The area occupied by each video image in the picture is calculated according to:

$$S_I = [R_I \div (R_1 + R_2 + R_3 + \ldots + R_N) \times L_1 +$$
$$B_I \div (B_1 + B_2 + B_3 + \ldots + B_N) \times L_2 +$$
$$F_I \div (F_1 + F_2 + F_3 + \ldots + F_N) \times L_3 +$$
$$PI \div (P_1 + P_2 + P_3 + \ldots + P_N) \times L_4 +$$
$$V_I \div (V_1 + V_2 + V_3 + \ldots V_N) \times L_5] \times S_{multi}.$$

$S_1$ indicates the area occupied by a video image sent by an $I^{th}$ conferencing terminal in the picture presented on the MCU display screen, $R_1$ indicates a resolution of the video image sent by the $I^{th}$ conferencing terminal, $B_1$ indicates a bandwidth of the video image sent by the $I^{th}$ conferencing terminal, $F_1$ indicates a frame rate of the video image sent by the $I^{th}$ conferencing terminal, $P_1$ indicates importance of the video image sent by the $I^{th}$ conferencing terminal, $V_1$ indicates volume of the video image sent by the $I^{th}$ conferencing terminal, and the value of I is 1 to N, where N is the number of conferencing terminals sending video images; $S_{multi}$ indicates the area of the picture presented on the MCU display screen; and $L_1$ is a coefficient, where $L_1+L_2+L_3+L_4+L_5=1$, $1 \geq L_1 \geq 0$, $1 \geq L_2 \geq 0$, $1 \geq L_3 \geq 0$, $1 \geq L_4 \geq 0$, and $1 \geq L_5 \geq 0$, and the values of $L_1$, $L_2$, $L_3$, $L_4$, and $L_5$ are decided by participants in the conference according to actual conditions and are carried in the video images and sent to the MCU.

Step 303: Determine, according to the video images sent by the N conferencing terminals and the picture presented on the MCU display screen, a direction of division of the picture presented on the MCU display screen.

The direction of division of the picture presented on the MCU display screen specifically has a horizontal direction of division of the picture presented on the MCU display screen, and a vertical direction of division of the picture presented on the MCU display screen.

For example, the picture is evenly divided into 5 regions according to the horizontal direction of the picture presented on the MCU display screen:

| Region 1 | Region 2 | Region 3 | Region 4 | Region 5 |
|---|---|---|---|---|

For example, the picture is evenly divided into 5 regions according to the vertical direction of the picture presented on the MCU display screen:

| |
|---|
| Region 1 |
| Region 2 |
| Region 3 |
| Region 4 |
| Region 5 |

The specific process of determining, according to the video images sent by the N conferencing terminals and the picture presented on the MCU display screen, a direction of division of the picture presented on the MCU display screen is: first, determining, according to the area that is occupied by each of the video images in the picture presented on the MCU display screen and is obtained by calculation in step 302, a conferencing terminal that sends a video image occupying a largest area in the picture presented on the MCU display screen as a first conferencing terminal;

```
If(A/C<E/D)
    K=1
Else if(A/C=E/D)
    If(A<E)
        K=1
    Else
        K=0
Else
    K=0,
``` where, the resolution of the picture presented on the MCU display screen is A×E, and the resolution of the video image sent by the first conferencing terminal is C×D; that is, calculating a first ratio of A/C, and calculating a second ratio of E/D, where the resolution of the picture is A×E, and the resolution of the video image sent by the first conferencing terminal is C×D; judging whether the first ratio is smaller than the second ratio; when the first ratio is smaller than the second ratio, determining that the direction of division of the picture presented on the MCU display screen is the horizontal direction of division of the picture presented on the MCU display screen; when the first ratio is equal to the second ratio and A is greater than E, determining that the direction of division of the picture presented on the MCU display screen is the vertical direction of division of the picture presented on the MCU display screen; when the first ratio is equal to the second ratio and A is smaller than E, determining that the direction of division of the picture presented on the MCU display screen is the horizontal direction of division of the picture presented on the MCU display screen; and when the first ratio is greater than the second ratio, determining that the direction of division of the picture presented on the MCU display screen is the vertical direction of division of the picture presented on the MCU display screen.

Step 304: Divide, according to the area occupied by each of the video images in the picture presented on the MCU display screen and the direction of division of the picture presented on the MCU display screen, the picture presented on the MCU display screen into N regions, and fill the video images sent by the N conferencing terminals into corresponding regions of the picture presented on the MCU display screen.

Herein, division refers to a technology of using an algorithm to virtually divide the picture presented on the MCU display screen so that two or more sub-pictures are presented in one picture.

According to the area that is occupied by each of the video images in the picture presented on the MCU display screen and is calculated in step 302, the present invention may use any one of the following modes to dynamically divide the picture presented on the MCU display screen, and fill the video images sent by the N conferencing terminals into corresponding regions of the picture presented on the MCU display screen.

Figure 4:
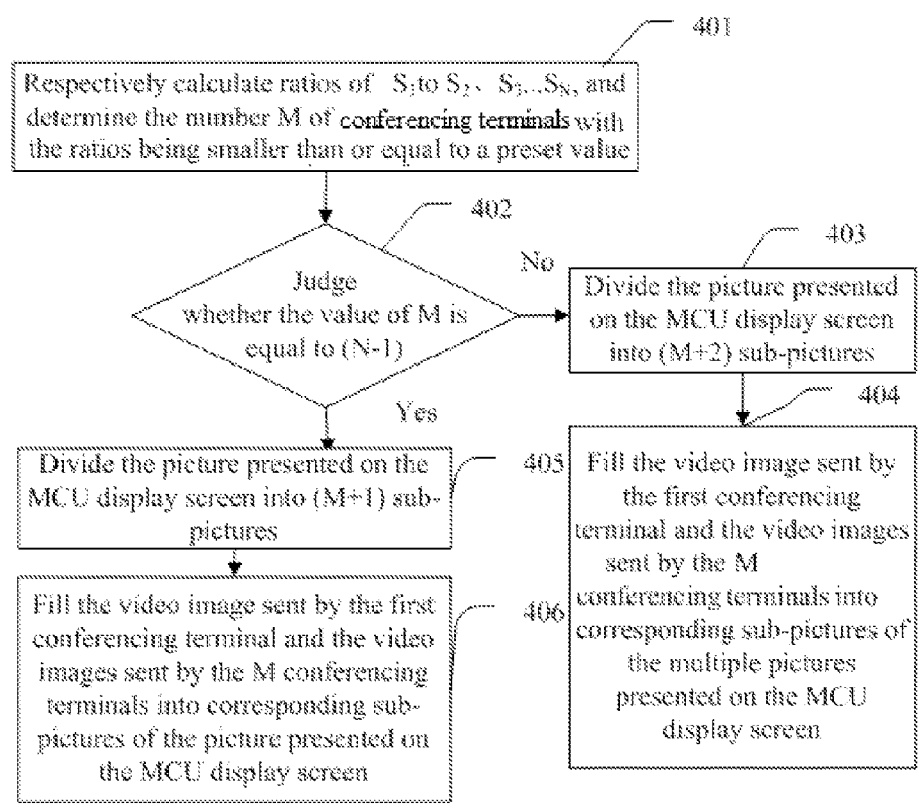
FIG. 4 is a flowchart of a method for multi-picture filling according to Embodiment 2 of the present invention.

Mode 1: As shown in FIG. 4, the procedure includes:

Step 401: Respectively calculate ratios of $S_1$ to $S_2$, $S_3$ ... $S_N$, and determine the number M of conferencing terminals with the ratios being smaller than or equal to a preset value, where M is a natural number.

Herein $S_1$ is the area occupied by the video image sent by the first conferencing terminal in the picture presented on the MCU display screen, $S_2$, $S_3$ ... $S_N$ is the area occupied by the video image sent by other conferencing terminals than the first conferencing terminal in the picture presented on the MCU display screen, and the preset value is determined according to the actual experience of workers, where, for example, the preset value may be 1.25.

Step 402: Judge whether the value of M is equal to (N−1), where N is the number of conferencing terminals sending video images.

Step 403: When M is not equal to (N−1), divide, according to the direction of division of the picture presented on the MCU display screen, $S_1$, and the area occupied by the video images sent by the M conferencing terminals in the picture presented on the MCU display screen, the picture presented on the MCU display screen into (M+2) sub-pictures.

For example, five conferencing terminals participate in the conference: conferencing terminal A, conferencing terminal B, conferencing terminal C, conferencing terminal D, and conferencing terminal E, where the video image sent by conferencing terminal A occupies the largest area in the picture presented on the MCU display screen, and therefore conferencing terminal A is the first conferencing terminal. After calculation, it is determined that $S_A/S_B$ is smaller than the preset value. Therefore, M is 1, and a conferencing terminal other than the first conferencing terminal is conferencing terminal B.

For example, the direction of division of the picture presented on the MCU display screen is the horizontal direction of division of the picture, M=1, and a conferencing terminal other than the first conferencing terminal is conferencing terminal B. In this case, the picture presented on the MCU display screen is divided into three sub-pictures according to the area occupied by the video image sent by the first conferencing terminal in the picture presented on the MCU display screen and the area occupied by the video images sent by the M conferencing terminals in the picture presented on the MCU display screen. Therefore, from left to right in the horizontal direction of the picture are a sub-picture divided for the first conferencing terminal and a sub-picture divided for conferencing terminal B, as shown in the following schematic diagram:

| 1 | 2 | 3 |
|---|---|---|
| Sub-picture divided for the first conferencing terminal | Sub-picture divided for conferencing terminal B | |

Step 404: Fill the video image sent by the first conferencing terminal and the video images sent by the M conferencing terminals into corresponding sub-pictures of the picture presented on the MCU display screen.

Specifically, according to the above schematic diagram, the video image sent by the first conferencing terminal is filled into the sub-picture divided for the first conferencing terminal, and the video image sent by conferencing terminal B is filled into the sub-picture divided for conferencing terminal B.

It should be noted that after the first conferencing terminal and the M conferencing terminals are filled, the video images sent by the remaining [N−(M+1)] conferencing terminals are filled, according to the method for MCU to optimize configuration of multiple pictures for the (M+1) conferencing terminals, into the remaining picture presented on the MCU display screen, which specifically includes: determining the area of the remaining picture presented on the MCU display screen, determining the area occupied by video images sent by other conferencing terminals than the first conferencing terminal and the M conferencing terminals in the new picture presented on the MCU display screen, determining a conferencing terminal that sends a video image occupying the largest area in the new picture presented on the MCU display screen, then calculating a direction of division of the new picture presented on the MCU display screen, dividing the new picture according to the direction of division of the new picture presented on the MCU display screen, and performing filling.

Step 405: When M is equal to (N−1), divide, according to the direction of division of the picture presented on the MCU display screen, $S_1$, and the area occupied by the video images sent by the M conferencing terminals in the picture presented on the MCU display screen, the picture presented on the MCU display screen into (M+1) sub-pictures.

For example, five conferencing terminals participate in the conference: conferencing terminal A, conferencing terminal B, conferencing terminal C, conferencing terminal D, and conferencing terminal E, where the video image sent by conferencing terminal A occupies the largest area in the picture presented on the MCU display screen, and therefore conferencing terminal A is the first conferencing terminal. After calculation, it is determined that: the ratio of $S_A$ to $S_B$ is smaller than the preset value, the ratio of $S_A$ to $S_C$ is smaller than the preset value, the ratio of $S_A$ to $S_D$ is smaller than the preset value, and the ratio of $S_A$ to $S_E$ is smaller than the preset value. Therefore, M is 4, and four conferencing terminals other than the first conferencing terminal are conferencing terminal B, conferencing terminal C, conferencing terminal D, and conferencing terminal E. Then, the picture presented on the MCU display screen is divided, according to the area occupied by the video image sent by each of the conferencing terminals in the picture presented on the MCU display screen, into (M+1) sub-pictures.

Step 406: Fill the video image sent by the first conferencing terminal and the video images sent by the M conferencing terminals into corresponding sub-pictures of the picture presented on the MCU display screen.

Specifically, the video images sent by the N conferencing terminals are filled into the picture according to the area occupied by the video images sent by the N conferencing terminals in the picture presented on the MCU display screen.

Figure 5:
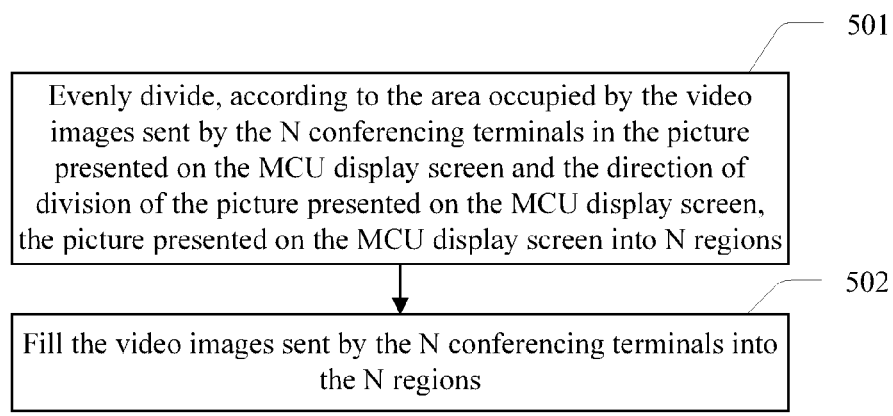
FIG. 5 is a flowchart of another method for multi-picture filling according to Embodiment 2 of the present invention.

Mode 2: As shown in FIG. 5, the procedure includes:

Step 501: Evenly divide, according to the area occupied by the video images sent by the N conferencing terminals in the picture presented on the MCU display screen and the direction of division of the picture presented on the MCU display screen, the picture presented on the MCU display screen into N regions.

For example, assuming that the video images sent by conferencing terminals A and B need to be displayed in the picture presented on the MCU display screen, the picture presented on the MCU display screen is evenly divided into 2 sub-pictures according to the direction of division of the picture presented on the MCU display screen.

Step 502: Fill the video images sent by the N conferencing terminals into the N regions.

Because sizes of the N regions divided in step 501 are the same, the video image sent by each conferencing terminal may occupy any region in the picture presented on the MCU display screen. After all the video images sent by the N conferencing terminals are filled into the picture presented on the MCU display screen, the picture presented on the MCU display screen changes into multiple pictures. The MCU sends the multiple filled pictures to each of the conferencing terminals, and the phenomenon of blank screens does not occur on the television of each of the conferencing terminals.

It should be noted that in the solution provided by the embodiment of the present invention, the multi-picture mode is automatically adjusted according to the number of conferencing terminals. When the number of video images displayed in the multiple pictures decreases or increases due to status change of conferencing terminals, the number of sub-pictures in the multiple pictures is also adjusted accordingly to present a better display effect to users.

In addition, in the solution provided by the embodiment of the present invention, the multi-picture filling mode is automatically adapted according to conditions of the conferencing terminals participating in the conference. Conditions of the conferencing terminals include but are not limited to: the number, resolutions, bandwidths, frame rates, importance, and volume of conferencing terminals. When filling is performed for the multiple pictures, a multi-picture filling mode may also be automatically adapted according to one of the conditions of each conferencing terminal.

For example, the multi-picture mode may be automatically adapted according to the frame rate; when the frame rate of a video image sent by a conferencing terminal is high, the sub-picture is big, and when the frame rate is low, the sub-picture is small. It is assumed that: currently conferencing terminals A and B join the conference, the frame rate of the video image sent by conferencing terminal A is 60 frames per second, and the frame rate of the video image sent by conferencing terminal B is 20 frames per second. According to 60/20*R=3/1*R (R>0), the following is obtained by calculation: It is necessary to divide the picture presented on the MCU display screen into W regions, where W is the sum of the denominator and numerator of the fraction indicating the ratio, and R is an adjusting coefficient and is usually 1. In this case, the picture is divided into four regions, where the video image sent by conferencing terminal A occupies three regions and the video image sent by conferencing terminal B occupies one region.

By using the method for MCU to optimize configuration of multiple pictures according to the embodiment of the present invention, the picture presented on the MCU display screen may be automatically divided according to the video image sent by each conferencing terminal, and the multi-picture filling mode is automatically adjusted. Compared with the prior art where the sub-picture layout in multiple pictures is fixed and the phenomenon of blank sub-picture screens may occur because a multi-picture mode is preset in MCU to optimize configuration of multiple pictures so that the picture presented on an output television of a conferencing terminal is unclear, the solution provided by the embodiment of the present invention can eliminate the phenomenon of blank sub-picture screens by using a dynamic multi-picture generation mode and make the picture presented on the output television of the conferencing terminal clear.

Figure 6:
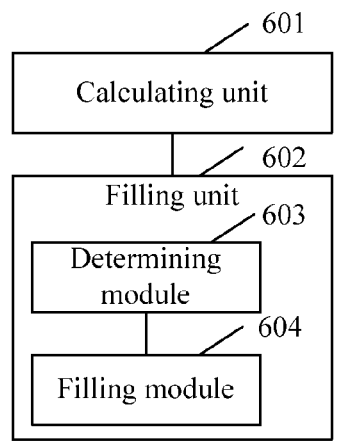
FIG. 6 is a block diagram of an apparatus for MCU to optimize configuration of multiple pictures according to Embodiment 2 of the present invention.

The embodiment of the present invention provides an apparatus for MCU to optimize configuration of multiple pictures. The apparatus may be an MCU or a conferencing terminal integrating an MCU to optimize configuration of multiple pictures processing unit. As shown in FIG. 6, the apparatus includes a calculating unit 601 and a filling unit 602, where the filling unit 602 includes a determining module 603 and a filling module 604.

The calculating unit 601 is configured to calculate, according to resolutions, bandwidths, frame rates, importance, and volume of received video images sent by N conferencing terminals, the area occupied by each of the video images in a picture presented on an MCU display screen.

Specifically, the calculating unit 601 first obtains resolutions, bandwidths, frame rates, importance, and volume of video images according to received video images sent by N conferencing terminals; and then calculates, according to the obtained resolutions, bandwidths, frame rates, importance, and volume of the video images, the area occupied by each of the video images in the picture presented on the MCU display screen.

The area occupied by each video image in the picture is calculated according to:

$$S_I = [R_I \div (R_1 + R_2 + R_3 + \ldots + R_N) \times L_1 +$$
$$B_I \div (B_1 + B_2 + B_3 + \ldots + B_N) \times L_2 +$$
$$F_I \div (F_1 + F_2 + F_3 + \ldots + F_N) \times L_3 +$$
$$PI \div (P_1 + P_2 + P_3 + \ldots + P_N) \times L_4 +$$
$$V_I \div (V_1 + V_2 + V_3 + \ldots V_N) \times L_5] \times S_{multi}.$$

$S_1$ indicates the area occupied by a video image sent by an $I^{th}$ conferencing terminal in the picture presented on the MCU display screen, $R_1$ indicates a resolution of the video image sent by the $I^{th}$ conferencing terminal, $B_1$ indicates a bandwidth of the video image sent by the $I^{th}$ conferencing terminal, $F_1$ indicates a frame rate of the video image sent by the $I^{th}$ conferencing terminal, $P_1$ indicates importance of the video image sent by the $I^{th}$ conferencing terminal, $V_i$ indicates volume of the video image sent by the $I^{th}$ conferencing terminal, and the value of I is 1 to N, where N is the number of conferencing terminals sending video images; $S_{multi}$ indicates the area of multiple pictures; and $L_1$ is a coefficient, where $L_1+L_2+L_3+L_4+L_5=1$, $1 \geq L_1 \geq 0$, $1 \geq L_2 \geq 0$, $1 \geq L_3 \geq 0$, $1 \geq L_4 \geq 0$, and $1 \geq L_5 \geq 0$. Herein, values of $L_1$, $L_2$, $L_3$, $L_4$, and $L_5$ are decided by participants in a conference according to actual conditions.

The filling unit 602 is configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen.

Specifically, the determining module 603 in the filling unit 602 is configured to determine, according to the video images sent by the N conferencing terminals and the picture presented on the MCU display screen, a direction of division of the picture presented on the MCU display screen.

Figure 7:
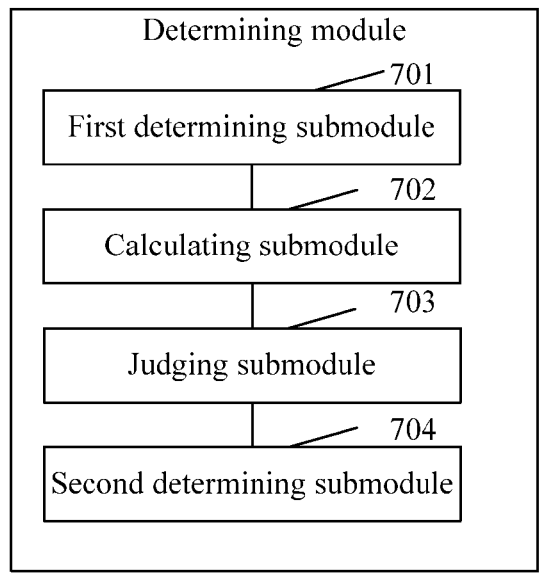
FIG. 7 is a block diagram of a determining module of an apparatus according to Embodiment 2 of the present invention.

When determining the direction of division of the picture presented on the MCU display screen, as shown in FIG. 7, the determining module 603 includes: a first determining submodule 701, a calculating submodule 702, a judging submodule 703, and a second determining submodule 704.

The first determining submodule 701 is configured to determine a conferencing terminal that sends a video image occupying a largest area in the picture presented on the MCU display screen as a first conferencing terminal.

The calculating submodule 702 is configured to calculate a first ratio of A/C, and calculate a second ratio of E/D, where a resolution of the picture is A×E, and a resolution of the video image sent by the first conferencing terminal is C×D.

Then the judging submodule 703 judges whether the first ratio is smaller than the second ratio.

When the first ratio is smaller than the second ratio, the second determining submodule 704 determines that the direction of division of the picture presented on the MCU display screen is a horizontal direction of division of the picture presented on the MCU display screen.

When the first ratio is equal to the second ratio and A is greater than E, the second determining submodule 704 is further configured to determine that the direction of division of the picture presented on the MCU display screen is a vertical direction of division of the picture presented on the MCU display screen; when the first ratio is equal to the second ratio and A is smaller than E, the second determining submodule 704 is further configured to determine that the direction of division of the picture presented on the MCU display screen is the horizontal direction of division of the picture presented on the MCU display screen.

When the first ratio is greater than the second ratio, the second determining submodule 704 is further configured to determine that the direction of division of the picture presented on the MCU display screen is the vertical direction of division of the picture presented on the MCU display screen.

The filling module 604 is configured to divide, according to the area occupied by each of the video images in the picture presented on the MCU display screen and the direction of division of the picture presented on the MCU display screen, the picture presented on the MCU display screen, and fill the video images sent by the N conferencing terminals into corresponding regions of the picture presented on the MCU display screen.

Figure 8:
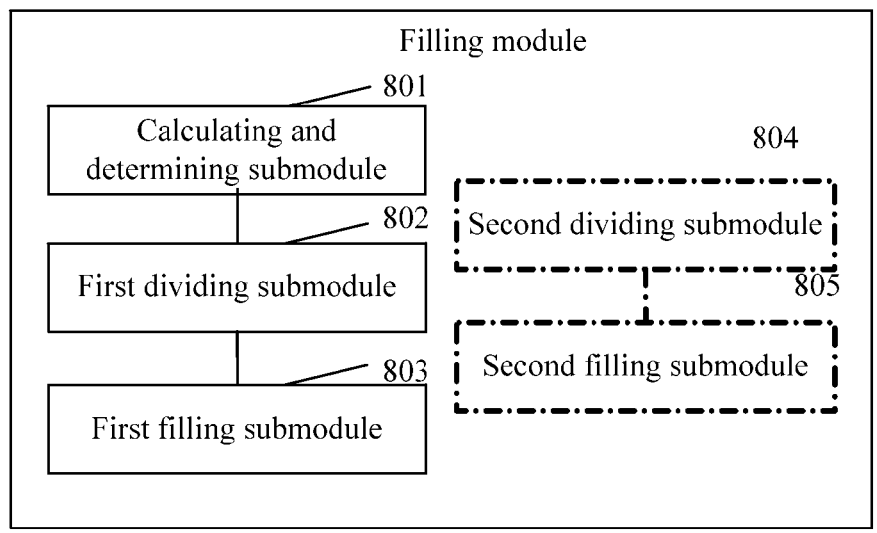
FIG. 8 is a block diagram of a filling module of an apparatus according to Embodiment 2 of the present invention.

Specifically, when the multiple pictures are filled, any of the following modes is included:

Mode 1: As shown in FIG. 8, the filling module 604 includes: a calculating and determining submodule 801, a first dividing submodule 802, a first filling submodule 803, a second dividing submodule 804, and a second filling submodule 805.

After the direction of division of the picture is determined, the calculating and determining submodule 801 is configured to respectively calculate ratios of $S_1$ to $S_2$, $S_3$, . . . , $S_N$, and determine the number M of conferencing terminals with the ratios being smaller than or equal to a preset value, where M is a natural number.

The preset value is determined according to the actual experience of workers, where, for example, the preset value may be 1.25.

The first dividing submodule 802 is configured to: when M is not equal to (N−1), divide, according to the direction of division of the picture presented on the MCU display screen, $S_1$, and the area occupied by the video images sent by the M conferencing terminals in the picture presented on the MCU display screen, the picture presented on the MCU display screen into (M+2) sub-pictures; and the first filling submodule 803 is configured to fill the video image sent by the first conferencing terminal and the video images sent by the M conferencing terminals into corresponding sub-pictures of the picture presented on the MCU display screen.

It should be noted that after the first conferencing terminal and the M conferencing terminals are filled, the video images sent by the remaining [N−(M+1)] conferencing terminals are filled, according to the method for MCU to optimize configuration of multiple pictures for the (M+1) conferencing terminals, into the remaining picture presented on the MCU display screen.

When M is equal to (N−1), the first dividing submodule 802 is further configured to divide, according to the direction of division of the picture presented on the MCU display screen, $S_1$, and the area occupied by the video images sent by the M conferencing terminals in the picture presented on the MCU display screen, the picture presented on the MCU display screen into (M+1) sub-pictures; and the first filling submodule 803 is further configured to fill the video images sent by the first conferencing terminal and the M conferencing terminals into corresponding sub-pictures of the picture presented on the MCU display screen.

Mode 2: The filling module 604 includes: a second dividing submodule 804 configured to evenly divide, according to the area occupied by the video images sent by the N conferencing terminals in the picture presented on the MCU display screen and the direction of division of the picture presented on the MCU display screen, the picture presented on the MCU display screen into N regions; and a second filling submodule 805 configured to fill the video images sent by the N conferencing terminals into the N regions.

After filling the video images sent by the N conferencing terminals into the picture presented on the MCU display screen, the MCU sends the multiple filled pictures to the conferencing terminals, and the output televisions of the conferencing terminals can present multiple pictures without blank screens.

The apparatus for MCU to optimize configuration of multiple pictures according to the embodiment of the present invention divides, after obtaining, analyzing, and calculating the video images sent by N conferencing terminals, the picture presented on the MCU display screen and fills the video images into the picture presented on the MCU display screen. Compared with the prior art where the sub-picture layout in multiple pictures is fixed and the phenomenon of blank sub-picture screens may occur because a multi-picture mode is preset to optimize configuration of multiple pictures so that the picture presented on an output television of a conferencing terminal is unclear, the solution provided by the embodiment of the present invention can eliminate the phenomenon of blank sub-picture screens by using a dynamic multi-picture generation mode and make the picture presented on the output television of the conferencing terminal clear.

The foregoing descriptions are merely specific embodiments of the present invention, but are not intended to limit the protection scope of the present invention. Any variation or replacement that can be easily figured out by persons skilled in the art within the technical scope disclosed in the present invention shall fall within the protection scope of the present invention. Therefore, the protection scope of the present invention shall be subject to the protection scope of the claims.

What is claimed is:

1. A method for a multipoint control unit (MCU) to optimize a configuration of multiple pictures, comprising:
    calculating, according to resolutions, bandwidths, frame rates, importance, and volume of received video images sent by N conferencing terminals, an area occupied by each of the video images in a picture presented on an MCU display screen, wherein N is a natural number greater than or equal to two; and
    dividing, according to the area occupied by each of the video images in the picture presented on the MCU display screen, the picture presented on the MCU display screen into N regions, and filling the video images sent by the N conferencing terminals into corresponding regions of the picture presented on the MCU display screen,
    wherein dividing, according to the area occupied by each of the video images in the picture presented on the MCU display screen, the picture presented on the MCU display screen into N regions, comprises:
    determining, according to the video images sent by the N conferencing terminals and the picture presented on the MCU display screen, a direction of division of the picture presented on the MCU display screen; and
    dividing the picture according to the area occupied by each of the video images in the picture presented on the MCU display screen and the direction of division of the picture presented on the MCU display screen.

2. A method for a multipoint control unit (MCU) to optimize a configuration of multiple pictures, comprising:
calculating, according to resolutions, bandwidths, frame rates, importance and volume of received video images sent by N conferencing terminals, an area occupied by each of the video images in a picture presented on an MCU display screen, wherein N is a natural number greater than or equal to two; and
dividing, according to the area occupied by each of the video images in the picture presented on the MCU display screen, the picture presented on the MCU display screen into N regions, and filling the video images sent by the N conferencing terminals into corresponding regions of the picture presented on the MCU display screen,
wherein calculating the area occupied by each of the video images in the picture presented on the MCU display screen comprises:
calculating the area occupied by each of the video images in the picture presented on the MCU display screen according to an equation:

$$S_I = [R_I \div (R_1 + R_2 + R_3 + \ldots + R_N) \times L_1 +$$
$$B_I \div (B_1 + B_2 + B_3 + \ldots + B_N) \times L_2 +$$
$$F_I \div (F_1 + F_2 + F_3 + \ldots + F_N) \times L_3 +$$
$$PI \div (P_1 + P_2 + P_3 + \ldots + P_N) \times L_4 +$$
$$V_I \div (V_1 + V_2 + V_3 + \ldots V_N) \times L_5] \times S_{multi},$$

wherein $S_I$ indicates the area occupied by a video image sent by an $I^{th}$ conferencing terminal in the picture presented on the MCU display screen, $R_I$ indicates a resolution of the video image sent by the $I^{th}$ conferencing terminal, $B_I$ indicates a bandwidth of the video image sent by the $I^{th}$ conferencing terminal, $F_I$ indicates a frame rate of the video image sent by the $I^{th}$ conferencing terminal, $P^I$ indicates importance of the video image sent by the $I^{th}$ conferencing terminal, $V_I$ indicates volume of the video image sent by the $I^{th}$ conferencing terminal and the value of I is 1 to N,
wherein $S_{multi}$ indicates the area of the picture presented on the MCU display screen,
wherein $L_i$ is a coefficient, and
wherein $L_1+L_2+L_3+L_4+L_5=1$, $1 \geq L_1 \geq 0$, $1 \geq L_2 \geq 0$, $1 \geq L_3 \geq 0$, $1 \geq L_4 > 0$, and $1 \geq L_5 \geq 0$.

3. A method for a multipoint control unit (MCU) to optimize a configuration of multiple pictures, comprising:
calculating, according to resolutions, bandwidths, frame rates, importance and volume of received video images sent by N conferencing terminals, an area occupied by each of the video images in a picture presented on an MCU display screen, wherein N is a natural number greater than or equal to two;
dividing, according to the area occupied by each of the video images in the picture presented on the MCU display screen, the picture presented on the MCU display screen into N regions, and filling the video images sent by the N conferencing terminals into corresponding regions of the picture presented on the MCU display screen; and
determining, according to the video images sent by the N conferencing terminals and the picture presented on the MCU display screen, a direction of division of the picture presented on the MCU display screen by:
determining a conferencing terminal that sends a video image occupying a largest area in the picture presented on the MCU display screen as a first conferencing terminal;
calculating a first ratio of A/C and a second ratio of E/D, wherein a resolution of the picture presented on the MCU display screen is A×E and a resolution of the video image sent by the first conferencing terminal is C×D, wherein A represents a horizontal resolution of the MCU display screen, E represents a vertical resolution of the MCU screen, C represents a horizontal resolution of the first conferencing terminal, and D represents a vertical resolution of the first conferencing terminal; C×D;
judging whether the first ratio is smaller than the second ratio;
determining, when the first ratio is smaller than the second ratio, that the direction of division of the picture presented on the MCU display screen is a horizontal direction of division of the picture presented on the MCU display screen;
determining, when the first ratio is equal to the second ratio and A is greater than B, that the direction of division of the picture presented on the MCU display screen is a vertical direction of division of the picture presented on the MCU display screen;
determining, when the first ratio is equal to the second ratio and A is smaller than B, that the direction of division of the picture presented on the MCU display screen is the horizontal direction of division of the picture presented on the MCU display screen; and
determining, when the first ratio is greater than the second ratio, that the direction of division of the picture presented on the MCU display screen is the vertical direction of division of the picture presented on the MCU display screen.

4. A method for a multipoint control unit (MCU) to optimize a configuration of multiple pictures, comprising:
calculating, according to resolutions, bandwidths, frame rates, importance, and volume of received video images sent by N conferencing terminals, an area occupied by each of the video images in a picture presented on an MCU display screen, wherein N is a natural number greater than or equal to two; and
dividing, according to the area occupied by each of the video images in the picture presented on the MCU display screen, the picture presented on the MCU display screen into N regions, and filling the video images sent by the N conferencing terminals into corresponding regions of the picture presented on the MCU display screen,
wherein dividing, according to the area occupied by each of the video images in the picture presented on the MCU display screen, the picture presented on the MCU display screen into N regions, and filling the video images sent by the N conferencing terminals into corresponding regions of the picture presented on the MCU display screen, comprise:
respectively calculating ratios of $S_1$ to $S_2$, $S_3$, ..., $S_N$, and determining a number M of conferencing terminals with the ratios being smaller than or equal to a preset value, wherein M is a natural number, wherein $S_1$ is the area occupied by the video image sent by the first conferencing terminal, $S_2$ is the area occupied by the video image sent by the second conferencing terminal, $S_3$ is the area occupied by the video image sent by the third conferencing terminal, and $S_N$ is the area occupied by image sent by the $N^{th}$ conference terminal;

when M is not equal to (N−1), dividing, according to the direction of division of the picture presented on the MCU display screen, $S_1$, and the area occupied by the video images sent by the M conferencing terminals in the picture presented on the MCU display screen, the picture presented on the MCU display screen into (M+2) sub-pictures, filling the video image sent by the first conferencing terminal and the video images sent by the M conferencing terminals into corresponding sub-pictures of the picture presented on the MCU display screen, and filling, according to the method for MCU to optimize configuration of multiple pictures for the (M+1) conferencing terminals, video images sent by the remaining [N−(M+1)] conferencing terminals, into the remaining picture presented on the MCU display screen; and when M is equal to (N−1), dividing, according to the direction of division of the picture presented on the MCU display screen, $S_1$, and the area occupied by the video images sent by the M conferencing terminals in the picture presented on the MCU display screen, the picture presented on the MCU display screen into (M+1) sub-pictures and filling the video image sent by the first conferencing terminal and the video images sent by the M conferencing terminals into corresponding sub-pictures of the picture presented on the MCU display screen.

5. A method for a multipoint control unit (MCU) to optimize a configuration of multiple pictures, comprising:

calculating, according to resolutions, bandwidths, frame rates, importance, and volume of received video images sent by N conferencing terminals, an area occupied by each of the video images in a picture presented on an MCU display screen, wherein N is a natural number greater than or equal to two; and dividing, according to the area occupied by each of the video images in the picture presented on the MCU display screen, the picture presented on the MCU display screen into N regions, and filling the video images sent by the N conferencing terminals into corresponding regions of the picture presented on the MCU display screen, wherein dividing, according to the area occupied by each of the video images in the picture presented on the MCU display screen, the picture presented on the MCU display screen into N regions, and filling the video images sent by the N conferencing terminals into corresponding regions of the picture presented on the MCU display screen, comprise:

evenly dividing, according to the area occupied by the video images sent by the N conferencing terminals in the picture presented on the MCU display screen and a direction of division of the picture presented on the MCU display screen, the picture presented on the MCU display screen into N regions; and filling the video images sent by the N conferencing terminals into the N regions.

6. An apparatus for a multipoint control unit (MCU) to optimize a configuration of multiple pictures, comprising:

a calculating unit configured to calculate, according to resolutions, bandwidths, frame rates, importance, and volume of received video images sent by N conferencing terminals, an area occupied by each of the video images in a picture presented on an MCU display screen, wherein N is a natural number greater than or equal to two; and a filling unit configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen, wherein the filling unit comprises:

a determining module configured to determine, according to the video images sent by the N conferencing terminals and the picture presented on the MCU display screen, a direction of division of the picture presented on the MCU display screen; and a filling module configured to divide the picture according to the area occupied by each of the video images in the picture presented on the MCU display screen and the direction of division of the picture presented on the MCU display screen, and fill the video images sent by the N conferencing into corresponding regions of the picture presented on the MCU display screen.

7. An apparatus for a multipoint control unit (MCU) to optimize a configuration of multiple pictures, comprising:

a calculating unit configured to calculate, according to resolutions, bandwidths, frame rates, importance, and volume of received video images sent by N conferencing terminals, an area occupied by each of the video images in a picture presented on an MCU display screen, wherein N is a natural number greater than or equal to two;

a filling unit configured to divide according to the area occupied by each of the video images in the picture presented on the MCU display screen, the picture presented on the MCU display screen into N regions, and fill the video images sent by the N conferencing terminals into corresponding regions of the picture presented on the MCU display screen; and a determining module comprising:

a first determining submodule configured to determine a conferencing terminal that sends a video image occupying a largest area in the picture presented on the MCU display screen as a first conferencing terminal;

a calculating submodule configured to calculate a first ratio of A/C and a second ratio of B/D, wherein a resolution of the picture presented on the MCU display screen is A×B and a resolution of the video image sent by the first conferencing terminal is C×D wherein A represents a horizontal resolution of the MCU display screen, E represents a vertical resolution of the MCU screen, C represents a horizontal resolution of the first conferencing terminal and D represents a vertical resolution of the first conferencing terminal;

a judging submodule configured to judge whether the first ratio is smaller than the second ratio; and a second determining submodule configured to:

determine, when the first ratio is smaller than the second ratio, that the direction of division of the picture presented on the MCU display screen is a horizontal direction of division of the picture presented on the MCU display screen;

determine, when the first ratio is equal to the second ratio and A is greater than B, that the direction of division of the picture presented on the MCU display screen is a vertical direction of division of the picture presented on the MCU display screen;

determine, when the first ratio is equal to the second ratio and A is smaller than B, that the direction of division of the picture presented on the MCU display screen is the horizontal direction of division of the picture presented on the MCU display screen; and determine, when the first ratio is greater than the second ratio, that the direction of division of the picture presented on the MCU display screen is the vertical direction of division of the picture presented on the MCU display screen.

8. An apparatus for a multipoint control unit (MCU) to optimize a configuration of multiple pictures, comprising:

a calculating unit configured to calculate, according to resolutions, bandwidths, frame rates, importance, and volume of received video images sent by N conferencing terminals, an area occupied by each of the video images in a picture presented on an MCU display screen, wherein N is a natural number greater than or equal to two;

a filling unit configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen; and a filling module comprising:

a calculating and determining submodule configured to respectively calculate ratios of $S_1$ to $S_2, S_3, \ldots, S_N$, and determine a number M of conferencing terminals with the ratios being smaller than or equal to a preset value, wherein M is a natural number, wherein $S_1$ is the area occupied by the video image sent by the first conferencing terminal, $S_2$ is the area occupied by the video image sent by the second conferencing terminal, $S_3$ is the area occupied by the video image sent by the third conferencing terminal, and $S_N$ is the area occupied by the video image sent by the $N^{th}$ conference terminal;

a first dividing submodule configured to, when M is not equal to (N−1), divide, according to the direction of division of the picture presented on the MCU display screen, $S_1$, and the area occupied by the video images sent by the M conferencing terminals in the picture presented on the MCU display screen, the picture presented on the MCU display screen into (M+2) sub-pictures; and a first filling submodule configured to fill the video image sent by the first conferencing terminal and the video images sent by the M conferencing terminals into corresponding sub-pictures of the picture presented on the MCU display screen, wherein the first dividing submodule is further configured to, when M is equal to (N−1), divide, according to the direction of division of the picture presented on the MCU display screen, $S_1$, and the area occupied by the video images sent by the M conferencing terminals in the picture presented on the MCU display screen, the picture presented on the MCU display screen into (M+1) sub-pictures, and wherein the first filling submodule is further configured to fill the video image sent by the first conferencing terminal and the video images sent by the M conferencing terminals into corresponding sub-pictures of the picture presented on the MCU display screen.

9. An apparatus for a multipoint control unit (MCU) to optimize a configuration of multiple pictures, comprising:

a calculating unit configured to calculate, according to resolutions, bandwidths, frame rates, importance, and volume of received video images sent by N conferencing terminals, an area occupied by each of the video images in a picture presented on MCU display screen, wherein N is a natural number greater than or equal to two;

a filling unit configured to divide, according to the area occupied by each of the video images in the picture presented on the MCU display screen, the picture presented on the MCU display screen into N regions, and fill the video images sent by the N conferencing terminals into corresponding regions of the picture presented on the MCU display screen; and a filling module comprising:

a second dividing submodule configured to evenly divide, according to the area occupied by the video images sent by the N conferencing terminals in the picture presented on the MCU display screen and a direction of division of the picture presented on the MCU display screen, the picture presented on the MCU display screen into N regions; and a second filling submodule configured to fill the video images sent by the N conferencing terminals into the N regions.

* * * * *

UNITED STATES PATENT AND TRADEMARK OFFICE
CERTIFICATE OF CORRECTION

PATENT NO. : 8,736,656 B2
APPLICATION NO. : 13/975862
DATED : May 27, 2014
INVENTOR(S) : Feng Zhang Page 1 of 2

It is certified that error appears in the above-identified patent and that said Letters Patent is hereby corrected as shown below:

In the Claims

Column 13, line 51-Column 14, line 38, Claim 3 should read:
A method for a multipoint control unit (MCU) to optimize a configuration of multiple pictures, comprising:
    calculating, according to resolutions, bandwidths, frame rates, importance, and volume of received video images sent by N conferencing terminals, an area occupied by each of the video images in a picture presented on an MCU display screen, wherein N is a natural number greater than or equal to two;
dividing, according to the area occupied by each of the video images in the picture presented on the MCU display screen, the picture presented on the MCU display screen into N regions, and filling the video images sent by the N conferencing terminals into corresponding regions of the picture presented on the MCU display screen; and
    determining, according to the video images sent by the N conferencing terminals and the picture presented on the MCU display screen, a direction of division of the picture presented on the MCU display screen by:
        determining a conferencing terminal that sends a video image occupying a largest area in the picture presented on the MCU display screen as a first conferencing terminal;
        calculating a first ratio of A/C and a second ratio of E/D, wherein a resolution of the picture presented on the MCU display screen is A×E and a resolution of the video image sent by the first conferencing terminal is C×D, wherein A represents a horizontal resolution of the MCU display screen, E represents a vertical resolution of the MCU screen, C represents a horizontal resolution of the first conferencing terminal, and D represents a vertical resolution of the first conferencing terminal;
        judging whether the first ratio is smaller than the second ratio;
        determining, when the first ratio is smaller than the second ratio, that the direction of division of the picture presented on the MCU display screen is a horizontal direction of division of the picture presented on the MCU display screen; and Signed and Sealed this
Thirteenth Day of January, 2015

Michelle K. Lee
*Deputy Director of the United States Patent and Trademark Office*

Claim 3 (continued) should read:

determining, when the first ratio is equal to the second ratio and A is greater than B, that the direction of division of the picture presented on the MCU display screen is a vertical direction of division of the picture presented on the MCU display screen;
      determining, when the first ratio is equal to the second ratio and A is smaller than B, that the direction of division of the picture presented on the MCU display screen is the horizontal direction of division of the picture presented on the MCU display screen: and
      determining, when the first ratio is greater than the second ratio, that the direction of division of the picture presented on the MCU display screen is the vertical direction of division of the picture presented on the MCU display screen.